(12) United States Patent
Suzuki et al.

(10) Patent No.: US 8,622,840 B2
(45) Date of Patent: Jan. 7, 2014

(54) INFORMATION PROCESSING DEVICE AND INFORMATION PROCESSING METHOD

(75) Inventors: Keiichiro Suzuki, Tokyo (JP); Masaomi Nishidate, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/123,011

(22) PCT Filed: Jun. 30, 2009

(86) PCT No.: PCT/JP2009/003045
§ 371 (c)(1),
(2), (4) Date: Jun. 22, 2011

(87) PCT Pub. No.: WO2010/041360
PCT Pub. Date: Apr. 15, 2010

(65) Prior Publication Data
US 2011/0250957 A1    Oct. 13, 2011

(51) Int. Cl.
*A63F 13/00* (2006.01)

(52) U.S. Cl.
USPC .............................................. 463/42; 463/30

(58) Field of Classification Search
USPC ................... 463/30, 42; 707/999.107; 700/91
See application file for complete search history.

(56) References Cited

U.S. PATENT DOCUMENTS

| | | | |
|---|---|---|---|
| 6,530,840 B1 * | 3/2003 | Cuomo et al. | 463/42 |
| 6,749,513 B2 * | 6/2004 | Park | 463/42 |
| 6,821,205 B2 * | 11/2004 | Takahashi et al. | 463/42 |
| 7,674,166 B2 * | 3/2010 | Takahashi et al. | 463/3 |
| 7,727,060 B2 * | 6/2010 | Mills | 463/13 |
| 7,877,509 B2 * | 1/2011 | Dhupelia et al. | 709/239 |
| 7,914,380 B2 * | 3/2011 | Takahashi | 463/40 |
| 2003/0064805 A1 * | 4/2003 | Wells | 463/39 |
| 2004/0267784 A1 * | 12/2004 | Byng | 707/100 |
| 2006/0287097 A1 * | 12/2006 | Moshal | 463/42 |
| 2008/0059580 A1 * | 3/2008 | Kalinowski et al. | 709/204 |
| 2008/0280686 A1 * | 11/2008 | Dhupelia et al. | 463/42 |
| 2008/0303811 A1 * | 12/2008 | Van Luchene | 345/419 |
| 2008/0318687 A1 * | 12/2008 | Backer et al. | 463/42 |
| 2009/0221373 A1 * | 9/2009 | Yamaguchi | 463/42 |
| 2009/0319616 A1 * | 12/2009 | Lewis et al. | 709/206 |

FOREIGN PATENT DOCUMENTS

| | | |
|---|---|---|
| JP | 10254851 | 9/1998 |
| JP | 11-250278 | 9/1999 |
| JP | 11250278 | 9/1999 |
| JP | 2003-88677 | 3/2003 |

(Continued)

OTHER PUBLICATIONS

Sample III, C. K., "PSP Hacks", copyright 2006, O'Reilly Media, pp. 200-205.*

(Continued)

*Primary Examiner* — James S McClellan
(74) *Attorney, Agent, or Firm* — Katten Muchin Rosenman LLP

(57) ABSTRACT

A table-top game device includes a lobby control unit and a room control unit. The lobby control unit displays an image of a lobby, a virtual space where a plurality of users exchange information, and displays objects associated with the plurality of users at predetermined positions in the lobby. The room control unit displays an image of a room, a virtual space where the users in the lobby can enter, along with the image of the lobby so that the user entering the room can know the objects in the lobby.

10 Claims, 13 Drawing Sheets

(56) References Cited

FOREIGN PATENT DOCUMENTS

| | | |
|---|---|---|
| JP | 2003-337776 | 11/2003 |
| JP | 2004-348647 | 12/2004 |
| JP | 2004348647 | 12/2004 |
| JP | 2005-224622 | 8/2005 |
| JP | 2005224622 | 8/2005 |
| JP | 2008-546469 | 12/2008 |
| WO | 2007/001628 | 1/2007 |
| WO | 2008/104784 | 9/2008 |

OTHER PUBLICATIONS

Notification of Reason(s) for Refusal dated Sep. 20, 2011, from corresponding Japanese Application No. 2008-262212.
Taishiro Ishitani. "Phantasy Star Universe Perfect Bible Initial Print" Phantasy Star Universe Perfect Bible, Enterbrain, Inc. Koichi Hamamura, Dec. 11, 2006, first edition, p. 228.
Notification of Reasons(s) for Refusal dated Dec. 6, 2011, from Dec. 6, 2011, from corresponding Japanese Application No. 2008-262212.
International Search Report dated Oct. 6, 2009 from the corresponding PCT/JP2009/003045, with English translation.
International Preliminary Report on Patentability dated May 17, 2011 from the corresponding PCT/JP2009/003045, with English translation.
Notification of Reason(s) for Refusal dated Mar. 19, 2013, from corresponding Japanese Application No. 2012-053124.
Notification of Reason(s) for Refusal dated Dec. 6, 2011, from corresponding Japanese Application No. 2008-262212.
XLink Kai EvolutionVII, Sep. 26, 2008, http://web.archive.org/web/20080926105932/http://xlink.planex.co.jp/index.html (searched on Nov. 17, 2011).
Got connected to XLink Kai in Monster Hunter Portable!, Dec. 8, 2005, http://waya.blog.so-net.ne.jp/2005-12-08 (searched on Nov. 17, 2011).
Trying "Game Link XII" planex that expands Psp online matches using "XLink Kai" Mar. 20, 2007, http://game.watch.impress.co.jp/docs/20070320/ggl.htm (searched on Nov. 17, 2011).
XLink Kai, Setting Procedure-Windows-, Sep. 26, 2008, http://web.archive.org/web/20080926190221/http://xlink.planex.co.jp/procedure_74_jp/win_step05.html (searched on Nov. 17, 2011).
Nui Kuruwa. "Monster Hunter Portable 2nd Official Guidebook", Initial Edition, CAPCOM Co., Ltd., Haruhiro Tsujimoto, Jul. 18, 2007, First Edition, p. 35.

* cited by examiner

INFORMATION PROCESSING DEVICE AND INFORMATION PROCESSING METHOD

TECHNICAL FIELD

The present invention relates to information processing technology and, more particularly, to an information processing device and an information processing method adapted to control user interface.

BACKGROUND ART

With the increasing availability of broadband communication services, a plurality of users at dispersed locations may play a game together in the same virtual space formed on a computer. Such a game is generally referred to as "online game". In an online game, a plurality of users may cooperate with each other or play against each other to advance the game.

SUMMARY OF THE INVENTION

Problem to be Solved by the Invention

To start an online game, users participating in the online game need to form a group. For this purpose, the user hosting a group needs to encourage a plurality of users at dispersed locations to participate in the group so as to recruit users participating in the group. If a group cannot be formed smoothly, users cannot start the online game, possibly losing interest in the online game.

The present invention addresses the issue and a primary purpose thereof is to provide a technology of aiding communication between a plurality of users at dispersed locations.

Means to Solve the Problem

The information processing device according to one embodiment of the present invention addressing the above issue comprises: a lobby display control unit configured to display an image of a lobby, a virtual space where a plurality of users exchange information, and to display objects associated with the plurality of users at predetermined positions in the lobby; and a room display control unit configured to display an image of a room, a virtual space where at least one of the plurality of users is allowed to form a group and where the users in the lobby can enter. The room display control unit displays the image of the room along with the image of the lobby so that the user presented with the image of the room can know the objects in the lobby.

Another embodiment of the present invention is an information processing method. The information processing method comprises: displaying an image of a lobby, a virtual space where a plurality of users exchange information, and displaying objects associated with the plurality of users at predetermined positions in the lobby; and displaying an image of a room, a virtual space where at least one of the plurality of users is allowed to form a group and where the users in the lobby can enter. Displaying of the image of the room displays the image of the room along with the image of the lobby so that the user presented with the image of the room can know the objects in the lobby.

Optional combinations of the aforementioned constituting elements, and implementations of the invention in the form of apparatuses, methods, systems, programs, and recording mediums having embodied thereon programs may also be practiced as additional modes of the present invention.

Advantage of the Present Invention

The present invention aids communication between a plurality of users at dispersed locations.

BEST MODE FOR CARRYING OUT THE INVENTION

The information exchange system according to an embodiment of the present invention provides a virtual space (hereinafter, also referred to as "community site" as necessary) where users exchange information about an online game with other users. In the following description, it is assumed that users form a group in a community site and start an online game with other users participating in the group.

In the community site, users participating in a group are provided with the group's screen so that users can exchange information with other users in the group. To know the status of a user not participating in the group yet, however, an extra action of leaving the room temporarily is required of the user according to the related art. The information exchange system of the embodiment facilitates communication between a plurality of users by eliminating the extra user action and improving user convenience in a community site.

The information exchange system according to the embodiment also aids communication between a plurality of users in such a way that the volume of data transmitted and received between devices in the system is reduced while smooth communication is maintained. In this way, the load and required resources in the network and the devices are reduced.

Figure 1:
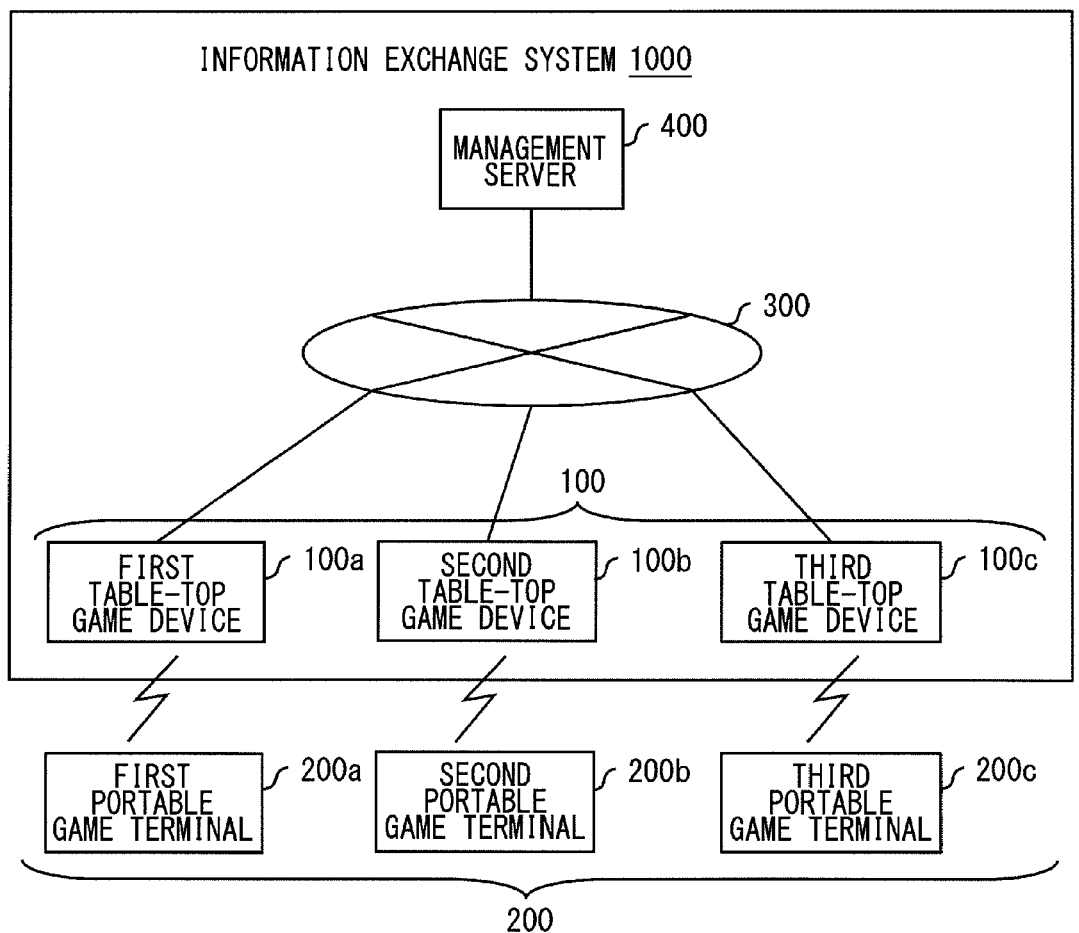
FIG. 1 shows the configuration of an information exchange system according to the embodiment.

FIG. 1 shows the configuration of an information exchange system 1000 according to the embodiment. The information exchange system 1000 comprises a first table-top game device 100a, a second table-top game device 100b, a third table-top game device 100c (generically, referred to as table-top game devices 100), and a management server 400.

Each of the table-top game devices 100 is connected wirelessly to a first portable game terminal 200a, a second portable game terminal 200b, and a third portable game terminal 200c. Further, the table-top game devices 100 are connected to each other via the Internet 300 and are also connected to the management server 400. The first portable game terminal 200a, the second portable game terminal 200b, and the third portable game terminal 200c will be generically referred to as "portable game terminals 200").

The management server 400 transmits data that should be set up for screen data for a communication site to the table-top game devices 100. The table-top game devices 100 transmit data entered by a user to the management server 400 and/or the other table-top game devices 100. The table-top game device 100 sets up screen data for the communication site by referring to the data received from the management server 400 and/or the other table-top game devices 100 and displays the screen on a display.

The portable game terminal 200 is a portable device that supports execution of an online game. The terminal is provided with a display capable of displaying a game. The portable game terminal 200 transmits and receives data related to a game (hereinafter, also referred to as "game data" as necessary) with other portable game terminals 200 via the table-top game device 100. The portable game terminal 200 uses the table-top game device 100 and the Internet 300 as a communication path for transmitting and receiving game data, i.e., a virtual tunnel, thereby implementing virtual ad-hoc communication with other portable game terminals 200.

Figure 2:
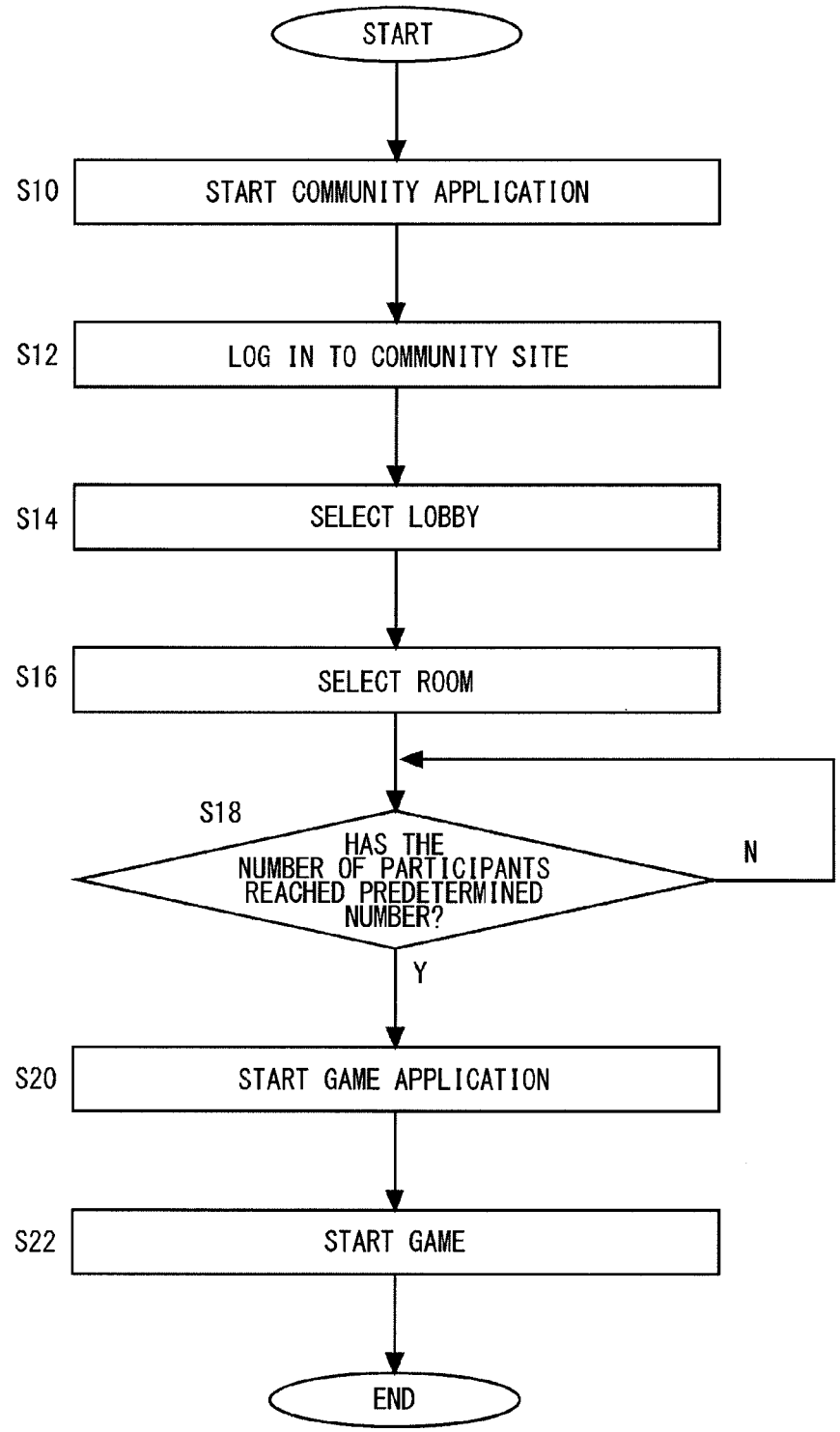
FIG. 2 is a flowchart showing procedures performed before the user starts an online game using the information exchange system.

FIG. 2 is a flowchart showing procedures performed before the user starts an online game using the information exchange system 1000. The user first starts an application for displaying a community site on a screen (hereinafter, also referred to as "community application" as necessary) in the table-top game device 100 (S10). The user logs in to the community site (S12) and selects one of a plurality of lobbies (S14). A "lobby" is a virtual space where a plurality of users join each other in a community site. Characters associated with the plurality of users are displayed so that the users can chat with each other.

The user then selects a "room" from the rooms created in the room (S16). A "room" is a virtual space users located in the lobby can enter. When a plurality of users enter a room, a group for playing an online game is formed. Characters associated with the users are also displayed in the room so that the users can chat with each other. The lobby is designed so that the user can create a room on its own. The user stands by until the number of participants in the room reaches a predetermined number or more, and, typically, the number defined for the room (N in S18). When the number of participants in the room reaches a predetermined number or more (Y in S18), each participant start an application for an online game (hereinafter, also referred to as "game application" as appropriate) in the portable game terminal 200 (S20), connecting the portable game terminal 200 to the table-top game device 100. Subsequently, the user starts the online game with other users (S22).

Figure 3:
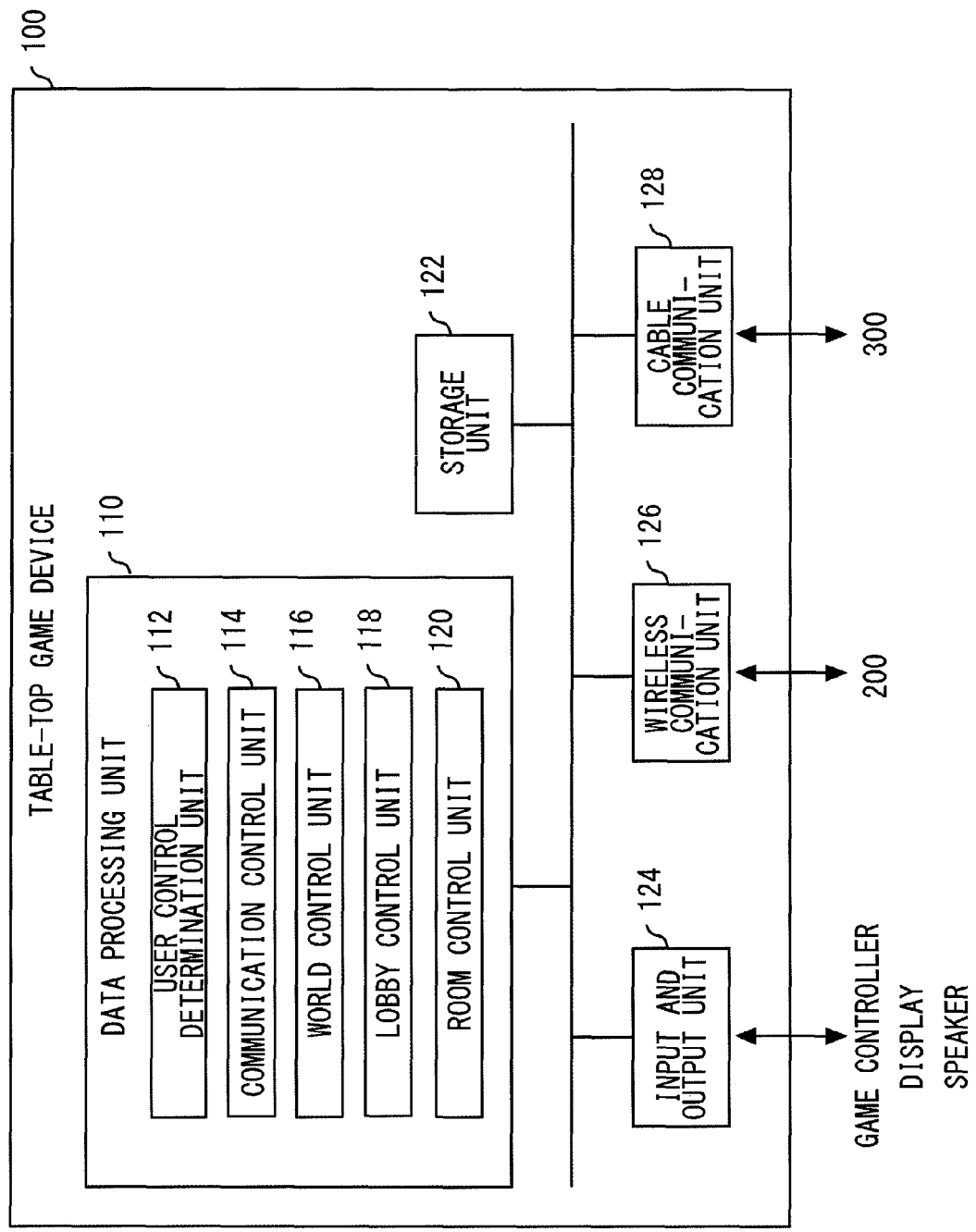
FIG. 3 is a block diagram showing the configuration of the table-top game device of FIG. 1.

FIG. 3 is a block diagram showing the configuration of the table-top game device 100 of FIG. 1. The table-top game device 100 comprises a data processing unit 110, a storage unit 122, an input and output unit 124, a wireless communication unit 126, and a cable communication unit 128. The constituting elements of the table-top game device 100 for running a game (e.g., a media drive unit, a game application execution unit, etc.) are publicly known so that the description thereof is omitted.

The blocks shown in the block diagrams of this specification are implemented by hardware such as a device (e.g., a computer CPU) or a mechanical apparatus, and by software such as a computer program. FIG. 3 depicts functional blocks implemented by the cooperation of hardware and software. Therefore, it will be obvious to those skilled in the art that the functional blocks may be implemented in a variety of manners by a combination of hardware and software.

The storage unit 122 is a storage area for storing data such as status information on users in the communication site, user names of other users registered as being friends, or address information for establishing connection with the table-top game devices 100 of other users.

The input and output unit 124 transmits and receives data to and from input and output devices connected to table-top game devices. Typically, the unit 124 exchanges data with a game controller, a display, and a speaker. For example, the unit 124 receives screen data from the data processing unit 110 and display the data on the display. The unit 124 also receives sound data and outputs the sound through a speaker. Further, the unit 124 receives instruction data from the game controller and transfers the data to the data processing unit 110.

The wireless communication unit 126 wirelessly transmits and receives data to and from the portable game terminal 200. The cable communication unit 128 transmits and receives data to and from the management server 400 and the table-top game device 100 via the Internet 300.

The data processing unit 110 performs functions installed in the community application. The data processing unit 110 comprises a user operation determination unit 112, a communication control unit 114, a world control unit 116, a lobby control unit 118, and a room control unit 120.

The user operation determination unit 112 detects, via the input and output unit 124, user operation by using the game controller. The unit 112 communicates the user operation data to the world control unit 116, the lobby control unit 118, and the room control unit 120 in accordance with the status information stored in the storage unit 122. For example, when the status information indicates "lobby is being entered", the user operation data indicating the user operation using the game controller is communicated to the lobby control unit 118.

The communication control unit 114 controls wireless communication in the wireless communication unit 126 and controls cable communication in the cable communication unit 128. The world control unit 116, the lobby control unit 118, the room control unit 120, which will be described later, transmit and receive data to and from an external device using the communication control unit 114 as necessary.

Figure 4:
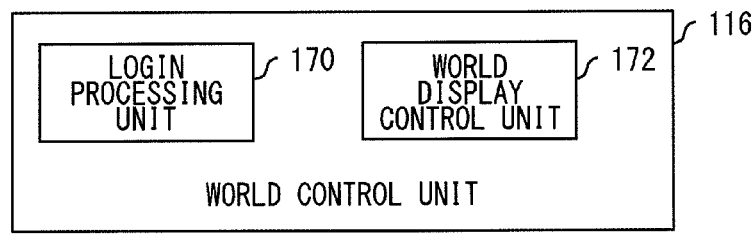
FIG. 4 shows the configuration of the world control unit of FIG. 3 in further detail.

The world control unit 116 controls a process related to the user interface of the "world". A "world" is a virtual space initially displayed when the user logs in to the community site. A list of a plurality of lobbies located in the community site is displayed. FIG. 4 shows the configuration of the world control unit 116 of FIG. 3 in further detail. The world control unit 116 comprises a login processing unit 170 and a world display control unit 172. The login processing unit 170 performs data processing required for the user to log in to the community site. The world display control unit 172 displays the screen of the world on the display via the input and output unit 124. Reference is made to FIG. 3 again.

Figure 5:
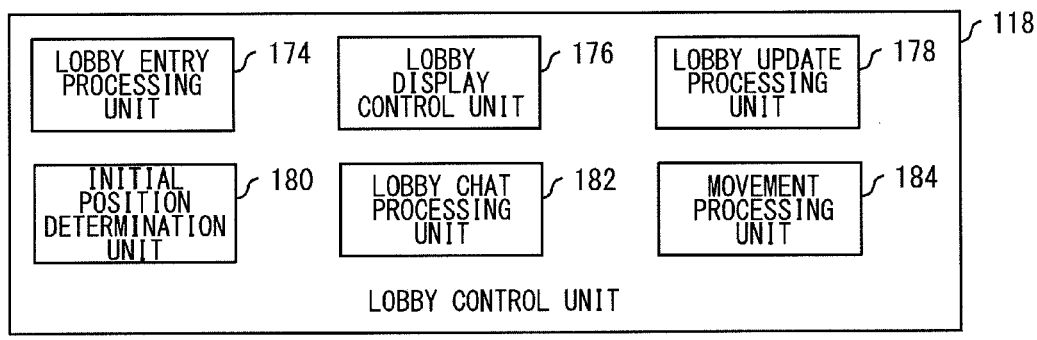
FIG. 5 shows the configuration of the lobby control unit of FIG. 3 in further detail.

The lobby control unit 118 controls a process related to the user interface of the lobby. FIG. 5 shows the configuration of the lobby control unit 118 of FIG. 3 in further detail. The lobby control unit 118 comprises a lobby entry processing unit 174, a lobby display control unit 176, a lobby update processing unit 178, an initial position determination unit 180, a lobby chat processing unit 182, and a movement processing unit 184. The lobby entry processing unit 174 performs a data process when a user enters the lobby. The lobby update processing unit 178 performs a data process when the status of the lobby is updated. The lobby display control unit 176 displays the screen of the lobby on the display via the input and output unit 124. The initial position determination unit 180 determines the initial display position of a character that should be displayed in the lobby. The lobby chat processing unit 182 performs a chat process for chats in the lobby. The movement processing unit 184 performs a data process when a character should be moved in the lobby. Reference is made to FIG. 3 again.

Figure 6:
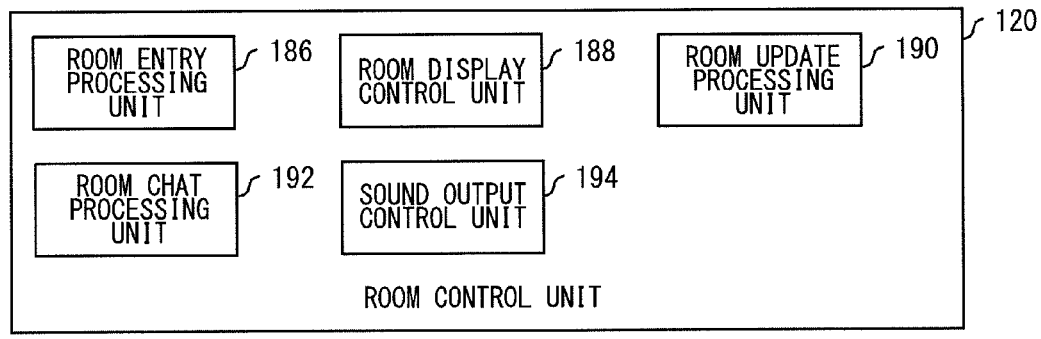
FIG. 6 shows the configuration of the room control unit of FIG. 3 in further detail.

The room control unit 120 controls a process related to the user interface of the room. FIG. 6 shows the configuration of the room control unit 120 of FIG. 3 in further detail. The room control unit 120 comprises a room entry control unit 186, a room display control unit 188, a room update processing unit 190, a room chat processing unit 192, a sound output control unit 194. The room entry processing unit 186 performs a data process when a user enters the room. The room update processing unit 190 performs a data process when the status of the room is updated. The room chat processing unit 192 performs a chat process for chats in the room. The sound output control unit 194 controls sound output from a speaker via the input and output unit 124.

A description will be given of the operation according to the configuration described above. The login processing unit 170 displays a login screen for logging in to the community site when the community application is started. The user operation determination unit 112 detects that a login operation is performed by the user in the login screen. When the login operation is detected, the user operation determination unit 112 updates the user's status information stored in the storage unit 122 to indicate "entering the world". The unit 112 also directs the login processing unit 170 to start a process described later that should be performed after login.

The login processing unit 170 acquires world information required to display the world from the management server 400, using the login user name. The world display control unit 172 sets up screen data for the world by referring to the world information. For example, the world information indicates, for each lobby included in the world, 1) the number of users in the lobby in relation to the upper limit of the number of users that can enter the lobby, i.e., the level of congestion in the lobby, 2) whether there are rooms created in the lobby, and 3) whether there are other users in the lobby registered by the visiting user as being friends (hereinafter, also referred to as "friend users").

Figure 7:
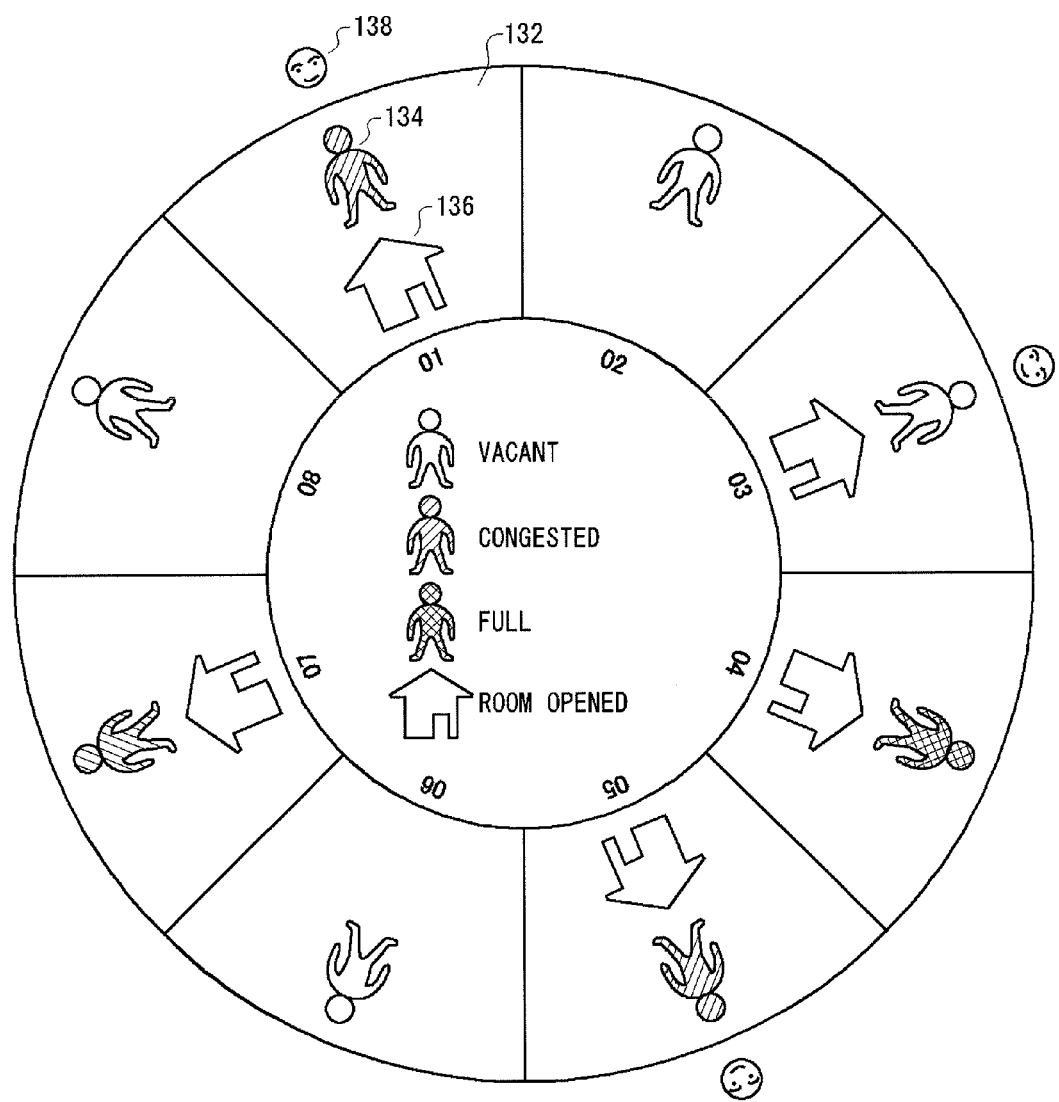
FIG. 7 shows a screen of a world displayed on the display of the user.

FIG. 7 shows a screen of a world 130 displayed on the display of the user. The world 130 includes lobby areas 132 respectively associated with a plurality of lobbies. The world 130 as illustrated includes eight lobby areas 132. A congestion level object 134, a room object 136, and a friend object 138 are displayed in association with each lobby area 132. The congestion level object 134 indicates the level of congestion in the lobby. The room object 136 indicates whether there are rooms created. The friend object 138 indicates whether there are friend users.

The user refers to the eight lobby areas 132 in the world 130 and selects one lobby area 132 to enter. As shown in FIG. 7, all lobbies are connected in a circle and displayed concurrently. Therefore, the user can easily compare the status of the lobbies and select a lobby that suits the user's preference.

The user operation determination unit 112 detects that the user requests entry into one of the lobby areas 132 in the world 130. Upon the detection, the user operation determination unit 112 updates the user's status information stored in the storage unit 122 to indicate "entering the lobby" and directs the lobby entry processing unit 174 to start a process.

The lobby entry processing unit 174 transmits the name of the user entering the lobby and the name of the lobby entered to the management server 400, causing the server 400 to store the names. Further, the unit 174 acquires, from the management server 400, the names of users already in the lobby that the user enters, the names of one or more rooms created in the lobby (hereinafter, also referred to as "created rooms"), and coordinate data indicating the position where the room is created. As described later, the lobby display control unit 176 sets up screen data for the lobby by referring to the acquired data. Hereinafter, users entering the lobby may generically be referred to as "lobby users".

Figure 8A:
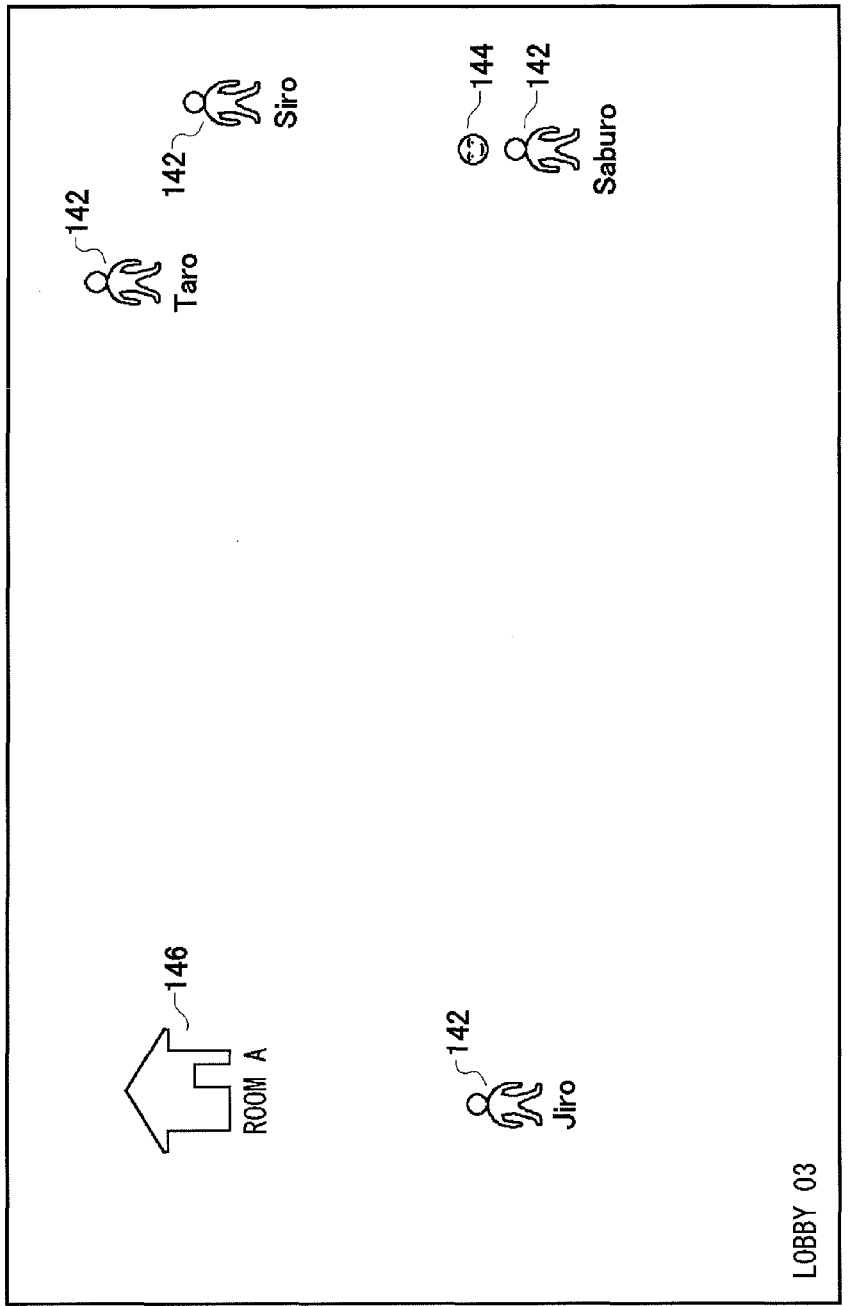
FIG. 8A shows a screen of a lobby displayed on the display of the first user.

FIG. 8A shows a screen of a lobby 140 displayed on the display of the first user. The figure shows a screen displayed on the display of the user "Taro" when the user "Taro" enters a lobby 03.

The lobby display control unit 176 sets up characters corresponding to the lobby users. In other words, the unit 176 sets up lobby user names for avatars 142 and sets up the avatars 142 in the screen data for the lobby 140. The lobby display control unit 176 also refers to the storage unit 122, using the lobby user names as a key, to determine whether any friend user is included in the lobby users. The unit 176 further sets up a friend object 144 for the avatar 142 of the friend user to indicate that the avatar is that of a friend. The lobby display control unit 176 sets up the avatar 142 in the screen data for the lobby 140 so that the avatar 142 is displayed at the initial display position determined by the initial display position determination unit 180 described later.

The lobby display control unit 176 further defines a created room name for a room object 146 corresponding to the room and sets up the room object 146 in the screen data for the lobby 140. In this process, the unit 176 sets up the room object 146 in the screen data for the lobby 140 so that the room object 146 is displayed at the position indicated by the coordinate data acquired by the lobby entry processing unit 174.

The management server 400 communicates the user name of the user newly entering the lobby 140 to the table-top game devices 100 of the users already in the lobby. The lobby update processing unit 178 in the table-top game device 100 of the notified users acquires communicated information from the management server 400 via the cable communication unit 128 and the communication control unit 114. The lobby update processing unit 178 directs the lobby display control unit 176 to set up the communicated user name for the avatar 142 corresponding to the user newly entering the lobby and to set up the avatar 142 in the screen data for the lobby 140. This allows the avatar of the user "Taro" to be displayed in the lobby 140 that the user "Jiro", already in the lobby 03, is viewing, as the user "Taro" enters the lobby 03.

Further, as described above, the user can create a new room object 146 in the lobby 140. The lobby update processing unit 178 detects that the user requests addition of a new room object 146 in the lobby 140 via the user operation determination unit 112. In this process, the lobby update processing unit 178 directs the lobby display control unit 176 to set up the new room object 146 in the screen data for the lobby 140. Further, the lobby update processing unit 178 communicates the name of the new room object 146 and the positional data thereof to the management server 400 via the communication control unit 114.

The management server 400 stores the name of the new room object 146 and the positional data communicated from the table-top game device 100 and communicates the name and the data to the other table-top game devices 100. Each of the lobby update processing unit 178 in the other data processing units 110 acquires the communication via the communication control unit 114 and directs the lobby display control unit 176 to add the new room object 146 at the position in the lobby 140 indicated by the positional data. In this way, the display of the room object 146 is synchronized between the table-top game devices 100.

A "room comment", a character string indicating the purpose of the room or the game type to the lobby users, is set up for the room object 146 by the user creating that room object. The room comment is not shown in the figure and can be acquired from the management server 400 and stored in the storage unit 122. The lobby display control unit 176 may set up the screen data for the lobby so that the room comment is displayed when the user moves the mouse pointer over the room object 146 in the lobby 140. Like the room object name, the room comment is communicated to the other table-top game devices 100 in the lobby so that the display of the room comment is synchronized.

A description will now be given of the method of determining the position that the avatar 142 is displayed. The initial position determination unit 180 locally determines the position of the avatar 142 displayed in the lobby in the initial status where the user enters the lobby. In other words, the initial position determination unit 180 in each of the table-top game devices 100 determines the initial position where the avatar 142 is displayed in the lobby 140 displayed locally. Therefore, when the user "Taro" displays the object of the lobby 140 initially, the avatar 142 in the lobby 140 is displayed at a position different from that of the user "Jiro" in the lobby 140. After determining the initial display position of the avatars 142, the initial position determination unit 180 causes the storage unit 122 to store the position.

Figure 8B:
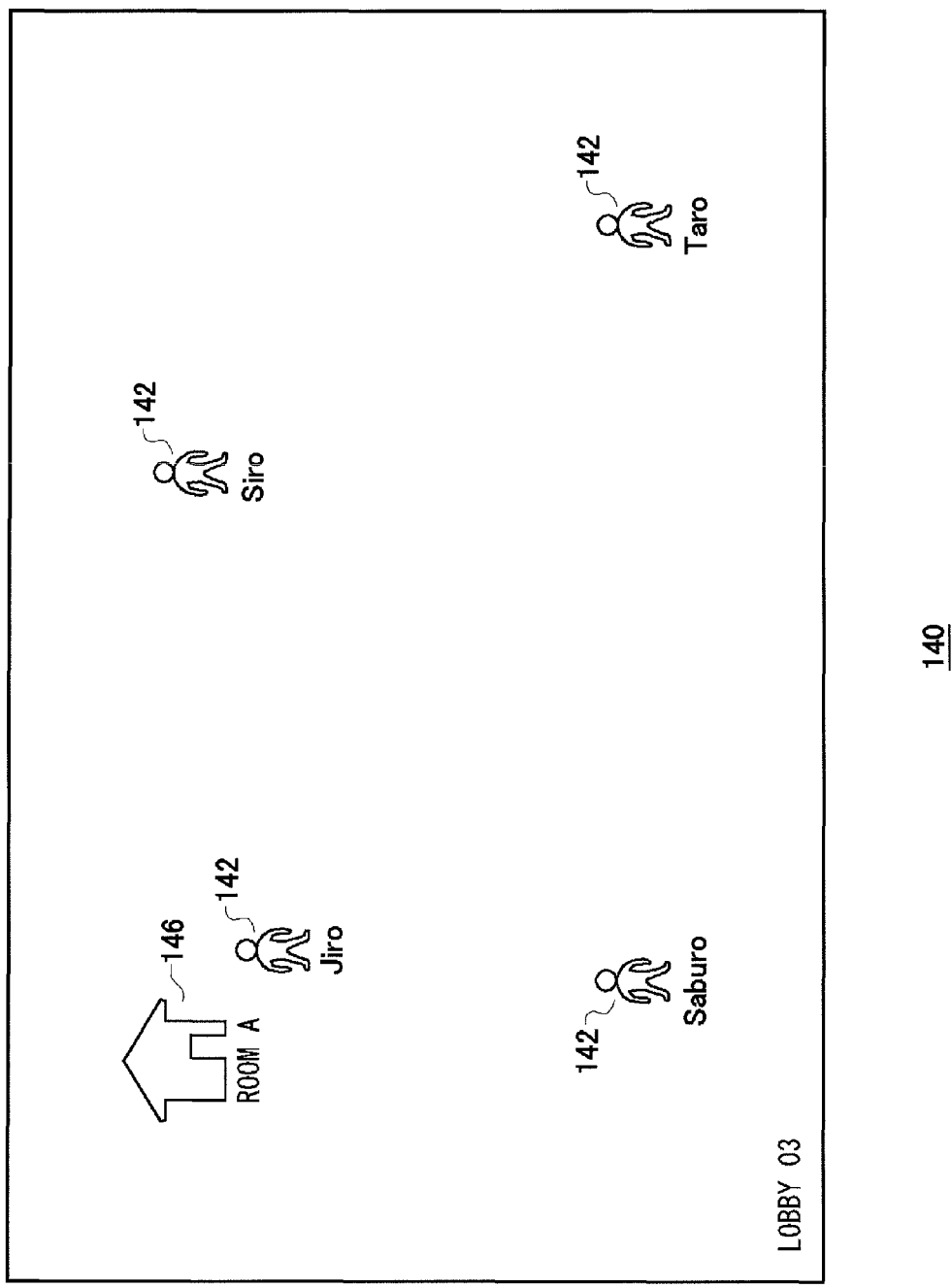
FIG. 8B shows a screen of a lobby displayed on the display of the second user.

FIG. 8B shows a screen of the lobby 140 displayed on the display of the second user. The figure shows a screen displayed on the display of the user "Jiro", who is already in the lobby 03, when the user "Taro" enters the lobby 03. For the reason described above, the position that the avatar 142 is displayed in the figure is different from that of FIG. 8A.

Thus, by allowing the initial position determination unit 180 to locally determine the initial display position of the associated avatar 142 in the lobby 140, the volume of data exchanged in the information exchange system 100 is reduced. For synchronization of the position of the avatar 142 between different table-top game devices 100, the management server 400 needs to manage not only entering users but also the positional data for the avatars 142 of the users and to communicate the data to the table-top game devices 100. In contrast, the embodiment is capable of reducing the load imposed on the management server 400 and the network and reducing the amount of resources consumed because the management server 400 only needs to make the users in the lobby 140 known. The inventive approach is particularly suitable when a large number of users enter the lobby 140.

Further, as described above, the lobby 140 is designed so that users can chat with each other. The lobby chat processing unit 182 detects, via the user operation determination unit 112, that a character string for a message from a user to another is entered and that a chat is requested. Upon the detection, the lobby chat processing unit 182 communicates the message character string to the lobby display control unit 176 and displays an object showing the message character string in the neighborhood of the avatar 142 of the user originating the message. Along with this, the lobby chat processing unit 182 transmits the originating user name and the message character string to the management server 400 via the communication control unit 114.

The management server 400 communicates the originating user name and the message character string to the other table-top game devices 100. The lobby chat processing unit 182 in the other table-top game devices 100 acquires the communication via the communication control unit 114 and directs the lobby display control unit 176 to display the message character string in the neighborhood of the avatar 142 of the originating user. This allows communication between users. For example, users can exchange information about the online game, etc. with other users. Alternatively, users can encourage other users to enter the room.

For convenience of user communication, the lobby 140 is designed so that the user can move the display position of the user's avatar 142. The movement processing unit 184 detects, via the user operation determination unit 112, that the user requests the movement of the avatar 142 in the lobby 140. Upon the detection, the movement processing unit 184 communicates the position of movement destination designated by the user to the lobby display control unit 176, moving the avatar 142 directed by the user to be moved to the position of the destination. Along with this, the movement processing unit 184 transmits the user name of the avatar 142 directed to be moved and positional data for the destination of the movement to the management server 400 via the communication control unit 114. Hereinafter, the user name of the avatar 142 directed to be moved may be referred to as "moved user name".

The management server 400 communicates the moved user name and the positional data for the destination of the movement to the other table-top game devices 100. The movement processing unit 184 of the other table-top game devices 100 acquires the communication via the communication control unit 114 and directs the lobby display control unit 176 to move the avatar 142 of the moved user name to the position indicated by the positional data for the destination of the movement. As a result, the display position of the moved avatar 142 is synchronized in all of the table-top game devices 100.

In this embodiment, the user can request designated avatar movement for moving the user's avatar 142 to "a position adjacent to a designated avatar 142" or designated arbitrary position movement for moving the user's avatar 142 to "an arbitrary position in the lobby 140".

Upon detecting a direction for designated avatar movement, the movement processing unit 184 informs the management server 400 of the positional data for the destination of movement by transmitting the user name set up for the avatar 142 at the destination of movement (hereinafter, also referred to as "movement destination user name"). The management server 400 communicates the moved user name and the movement destination user name to the other table-top game devices 100.

When informed by the management server 400 of the positional data for the destination of movement, i.e., the movement destination user name, the movement processing unit 184 acquires the display position of the avatar 142 associated with the movement destination user from the storage unit 122 and determines a position adjacent the acquired position as the new display position of the avatar 142 associated with the moved user. The movement processing unit 184 causes the storage unit 122 to store the new display position of the avatar 142 of the moved user. Along with this, the unit 184 directs the lobby display control unit 176 to move the avatar 142 of the moved user to the new display position.

Upon detecting a direction for designated arbitrary position movement, the movement processing unit 184 informs the management server 400 of the positional data for the destination of movement by transmitting coordinate data indicating the destination of movement in the lobby 140. The management server 400 communicates the moved user name and the coordinate data for the destination of movement to the other table-top game devices 100.

When informed by the management server 400 of the positional data for the destination of movement, i.e., the coordinate data for the destination of movement, the movement processing unit 184 defines the position in the lobby 140 indicated by the coordinate data as the new display position of the avatar 142 associated with the moved user and causes the storage unit 122 to store the new display position. Along with this, the unit 184 directs the lobby display control unit 176 to move the avatar 142 of the moved user to the new display position.

Figure 9A:
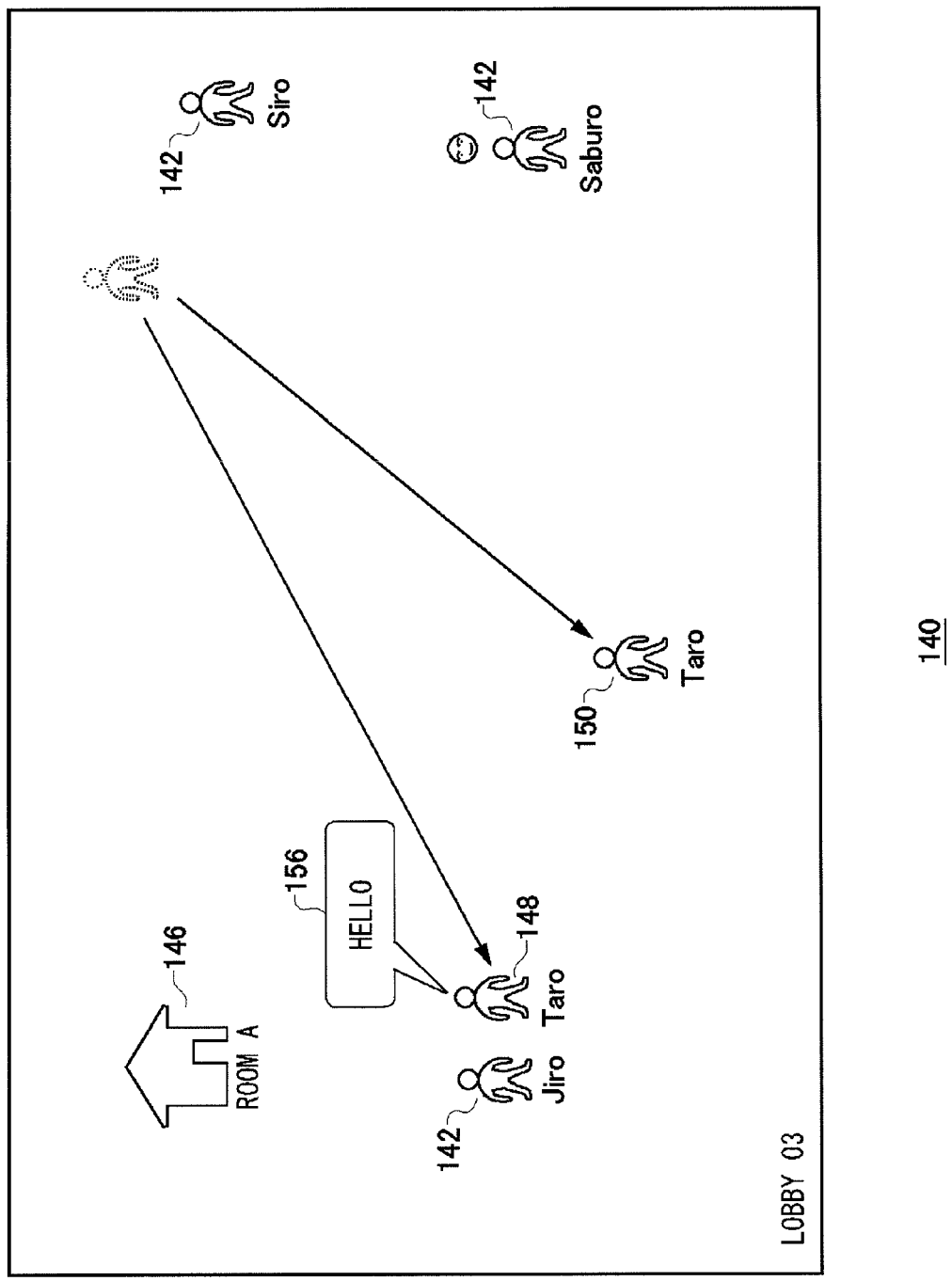
FIG. 9A shows a screen of a lobby displayed on the display of the first user.

FIG. 9A shows a screen of the lobby 140 displayed on the display of the first user. The figure shows a screen displayed on the display of the user "Taro" when the user "Taro" moves the avatar 142 of "Taro" in FIG. 8A. An avatar 148 of "Taro" in the figure is displayed after the user "Taro" requests designated avatar movement to the avatar 142 of "Jiro". An avatar 150 of "Taro" in the figure is displayed after the user "Taro" requests designated arbitrary position movement. A message object 156 indicates a message character string entered by the user "Taro" and is displayed when a request for a chat is provided by the user "Taro".

Figure 9B:
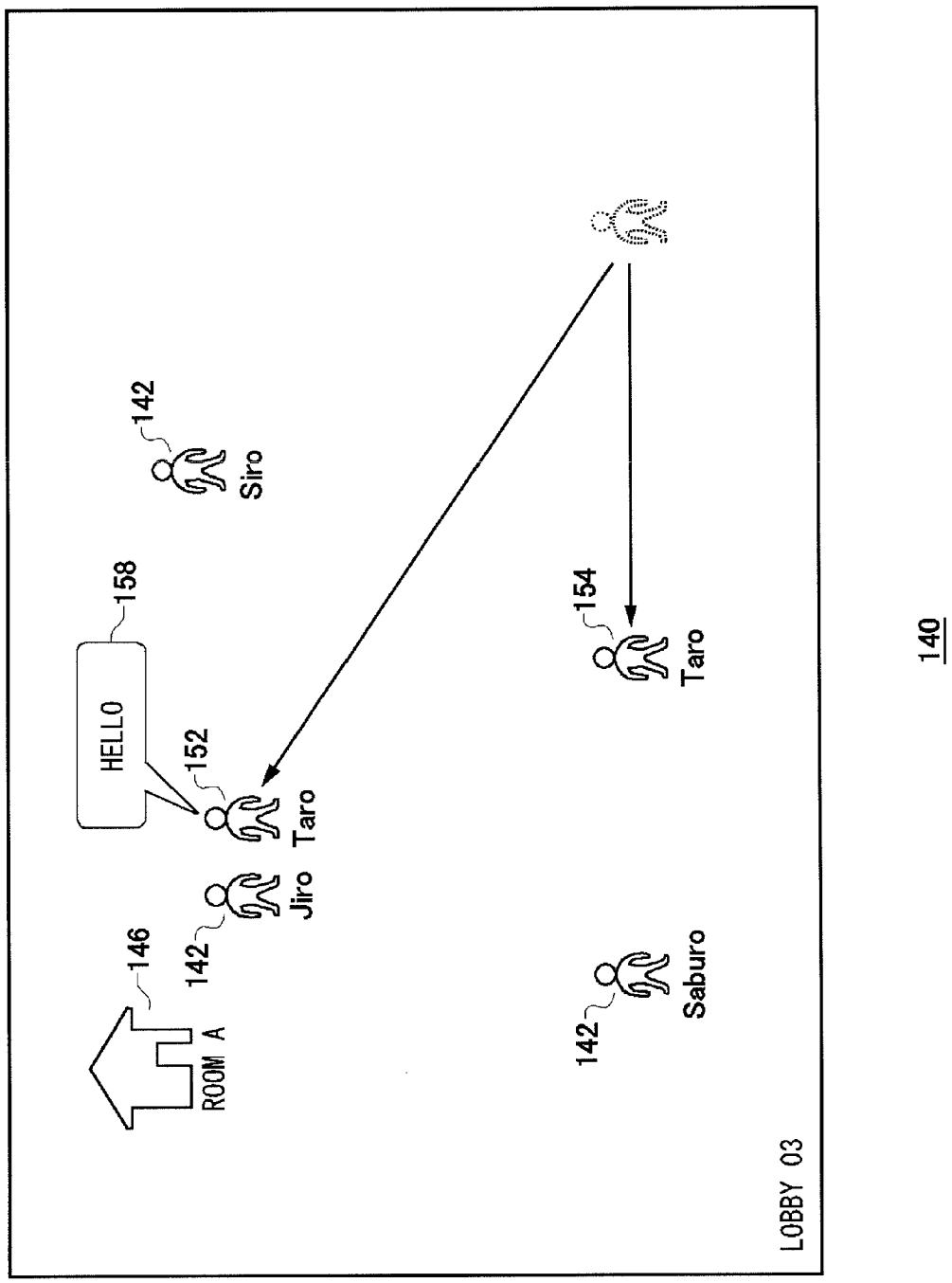
FIG. 9B shows a screen of a lobby displayed on the display of the second user.

FIG. 9B shows a screen of the lobby 140 displayed on the display of the second user. The figure shows a screen displayed on the display of the user "Jiro" when the user "Taro" moves the avatar 142 of "Taro" in FIG. 8A. Avatars 152 and 154 of "Taro " and a message object 158 in the figure correspond to the avatars 148 and 150 of "Taro" and the message object 156 in FIG. 9A, respectively.

As shown in FIGS. 9A and 9B, as the avatar of "Taro" moves adjacent to the avatar of "Jiro" in the lobby 140 of the user "Taro", the avatar of "Taro" in the lobby 140 of the user "Jiro" also moves adjacent to the avatar of "Jiro". As the avatar of "Taro" moves to a designated position in the lobby 140 of the user "Taro", the avatar of "Taro" in the lobby 140 of the user "Jiro" also moves to the designated position.

Thus, according to the embodiment, the position of the avatar 142 is synchronized between the table-top game devices 100, prompted by the movement of the avatar 142 in the lobby 140. As shown in FIGS. 9A and 9B, communication between users can take place regardless of the difference in the initial position of the avatar 142 in the lobby 140 by maintaining consistency in the post-movement position between the table-top game devices 100. The management server 400 does not need to store positional data for the destination of movement of the avatar 142. The server only needs to route the data. This reduces the processing load and the amount of resources consumed in the management server 400. The inventive approach is particularly suitable when a large number of users enter the lobby 140.

The user operation determination unit 112 detects that the user requests entry into the room object 146 in the lobby 140. Upon the detection, the user operation determination unit 112 updates the user's status information stored in the storage unit 122 to indicate "entering the room" and directs the room entry processing unit 186 to start a process.

The room entry processing unit 186 transmits the name of the user entering the room and the name of the room entered to the management server 400, causing the server 400 to store the names. Further, the unit 186 acquires, from the management server 400, the names of users already in the lobby that the user enters, the address information for connection to the table-top game devices 100 of the other users, and the capacity of the room. The room entry processing unit 186 causes the storage unit 122 to store the address information on the table-top game devices 100 of the other users. The unit 186 compares the capacity of the room with the number of users in the room so as to identify the status of the room. As described later, the room display control unit 188 sets up the screen data for the room by referring to the data. Hereinafter, users entering the room may also be generically referred to as "room users" as appropriate.

The room entry processing unit 186 also notifies the lobby display control unit 176 of the entry of the user in the room. In this process, the lobby display control unit 176 updates the screen data for the lobby 140 so that the avatar 142 associated with the user entering the room is not displayed in the lobby 140. For example, the unit 176 may delete the data for the avatar 142 from the screen data for the lobby 140.

Figure 10:
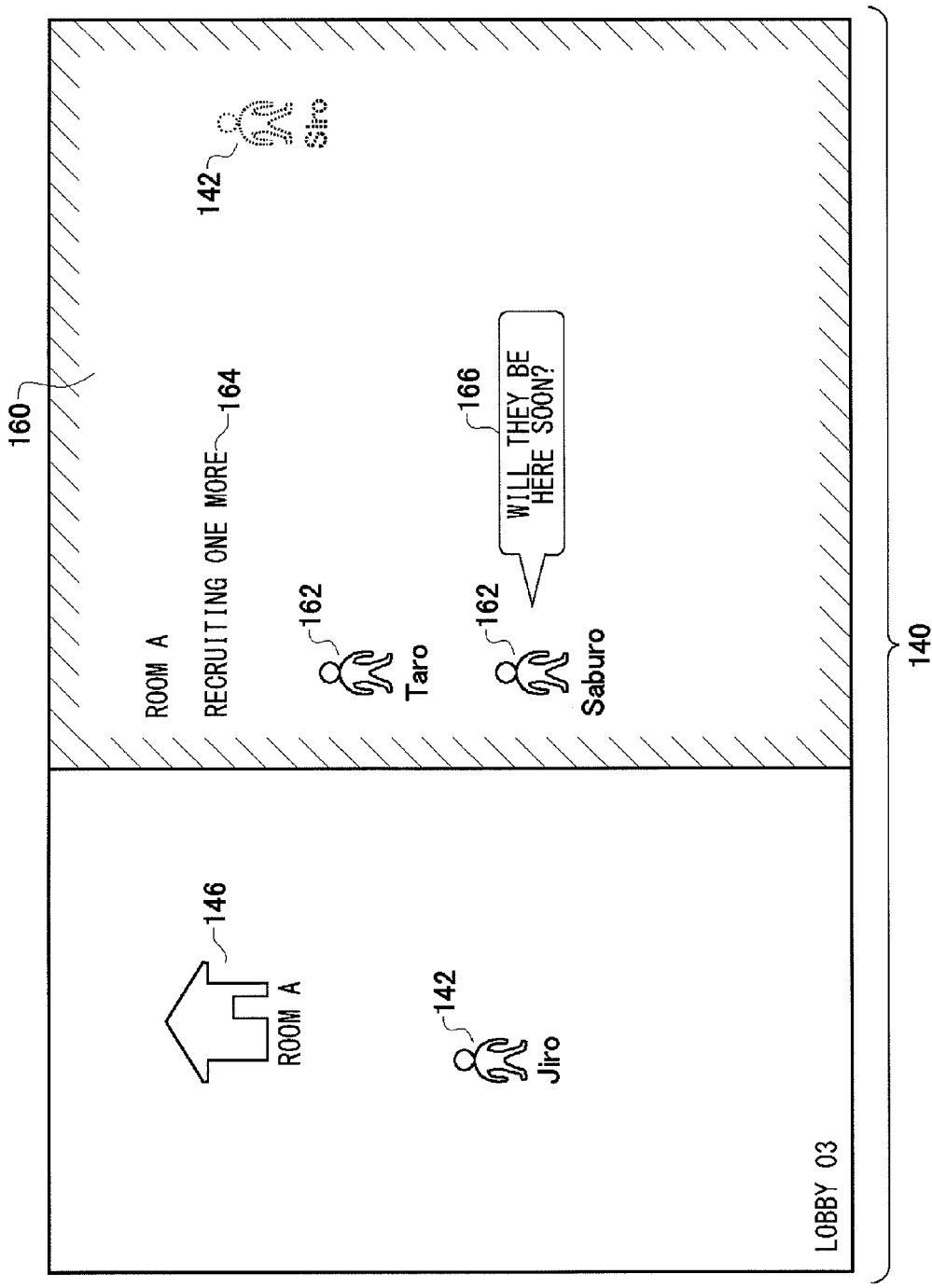
FIG. 10 shows a screen of a room displayed on the display of the user.

FIG. 10 shows a screen of a room 160 displayed on the display of the user. The figure shows a screen displayed on the display of the user "Taro" when the user "Taro" enters a room A in the lobby 140.

The room display control unit 188 displays an image of the room 160 by setting up predetermined transparency of the image of the room 160 and superimposing the image of the lobby 140 set up by the lobby display control unit 176 and the image of the room 160. Publicly known technology such as α blending may be applied to set up predetermined transparency. FIG. 10 shows the image of the room 160 superimposed on the image of the lobby 140, showing the avatar 142 of "Shiro" in the lobby 140 beneath the image of the room 160. The avatars 142 associated with the users "Taro" and "Saburo" entering the room A are deleted from the lobby 140.

The room display control unit 188 sets up room user names for avatars 162 associated with the room users and sets up the avatars 162 in the screen data for the room 160. Further, the unit 188 displays a status object 164 indicating the status of the room identified by the room entry processing unit 186 in the screen data for the room 160. The status object 164 of FIG. 10 shows that two users are in the room of the capacity of three users so that the room can accommodate one more user.

The management server 400 communicates the user name of the user newly entering the room and the address information for connection to the table-top game device 100 of the entering user to the table-top game devices 100 of the users already in the room. The room update processing unit 190 in the table-top game devices 100 of the notified users acquires communicated information from the management server 400 via the communication control unit 114. The room update processing unit 190 causes the storage unit 122 to store the address information on the table-top game device 100 of the newly entering user.

The room update processing unit 190 directs the room display control unit 188 to set up the communicated user name for the avatar 162 associated with the user newly entering the room and adds the avatar 162 in the screen data for the room 160. Further, the room update processing unit 190 updates the status of the room. In this way, the display of the room 160 is synchronized between the room users in the same room. The room update processing unit 190 further directs the lobby display control unit 176 to delete the avatar 142 associated with the user entering the room from the lobby 140. In this way, the avatars 142 located in the lobby 140 are synchronized between the room users in the same room.

As described above, the room 160 is designed so that the users can chat with each other. The room chat processing unit 192 detects, via the user operation determination unit 112, that a character string for a message from a user to another is entered and that a chat is requested. Upon the detection, the room chat processing unit 192 communicates the message character string to the lobby display control unit 176, causing the unit 176 to display a message object 166 showing the message character string in the neighborhood of the avatar 162 of the user originating the message. Along with this, the room chat processing unit 192 transmits the originating user name and the message character string to the table-top game devices 100 of the other room users via the communication control unit 114.

In this process, the communication control unit 114 refers to the storage unit 122 and designates the address information on the table-top game devices 100 of the other room users as the destination of transmission. In this way, message exchange between room users is not mediated by the management server 400 and is implemented by peer-to-peer (P2P) connection of the table-top game devices 100 of the room users. This reduces the load imposed on the management server 400 and the network and reduces the amount of resources consumed. The inventive approach is particularly suitable when a large number of users enter the lobby 140.

Figure 11:
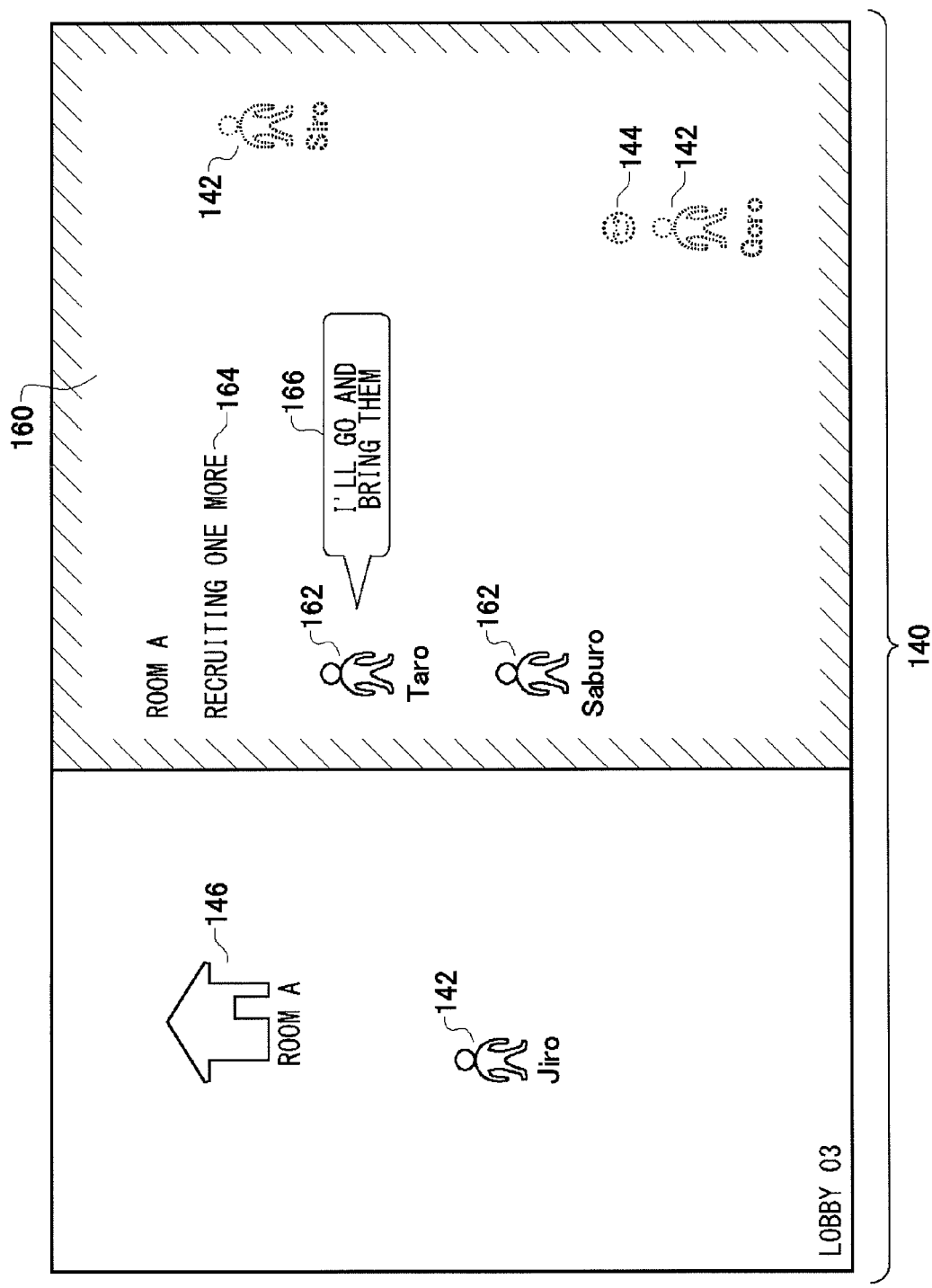
FIG. 11 shows a screen of a room displayed on the display of the user.

FIG. 11 shows a screen of the room 160 displayed on the display of the user. The figure shows the user "Goro", a friend user of the user "Taro", enters the lobby 140, leaving the status shown in FIG. 10. The image of the room 160 is displayed in a semitransparent fashion so that the room user can know the status of the lobby 140, and, in this case, the avatar 142 of "Goro", a new lobby use. Further, the room user can know the friend object 144 set up by the lobby display control unit 176 for the avatar 142 of "Goro". In other words, the room user can view the entry of his or her friend user in the lobby 140.

For example, the user "Taro" in the status of FIG. 11 can leave the room A temporarily and return to the lobby 140 to chat with the avatar 142 of "Goro" and encourage the user "Goro" to enter the room A. A plurality of users making an arrangement to play an online game may enter the lobby 140 at different points of time. As a result, the user entering the lobby 140 before other users may often create a room and enter the room. According to the embodiment, the room user can know the status of the lobby so that the room user can guide a friend user entering the lobby later into the room. The room user does not need to leave the room 160 to know the status of the lobby 140. An extra action of leaving the room is eliminated so that user convenience is improved.

Figure 12:
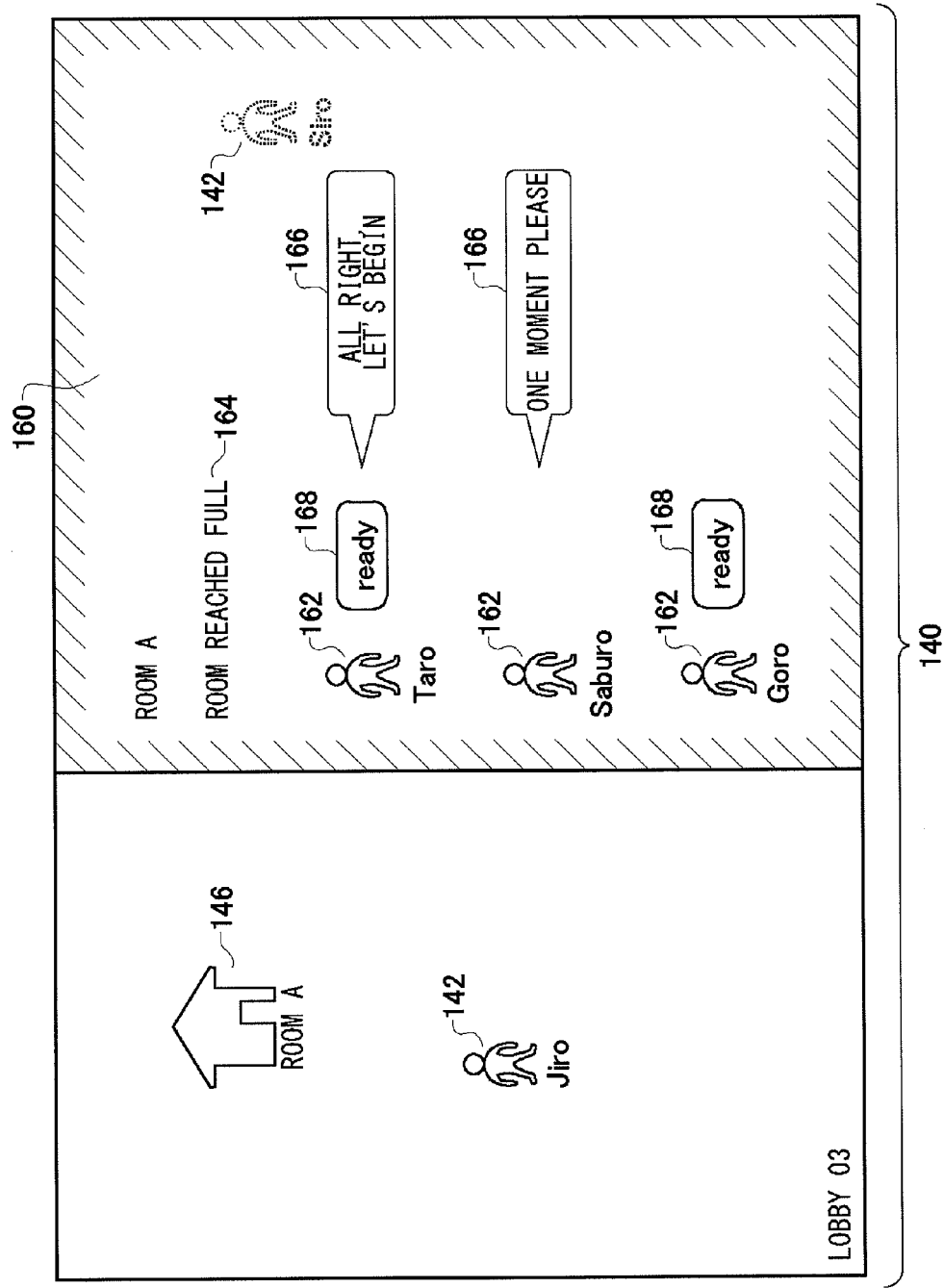
FIG. 12 shows a screen of a room displayed on the display of the user.

FIG. 12 shows a screen of the room 160 displayed on the display of the user. The figure shows that the room A reaches its capacity as the user "Goro" enters the room A, leaving the status of FIG. 11.

As described above, when the number of room users reaches the capacity, the room users turn the portable game terminals 200 on and start the game application so as to start the online game. In this process, the portable game terminal 200 transmits, to the table-top game device 100, a connection request requesting ad-hoc connection with the other portable game terminals 200. The table-top game device 100 receiving the request will be referred to as "connection source table-top game device 100".

The wireless communication unit 126 of the connection source table-top game device 100 receives the connection request and transfers the request to the communication control unit 114. The communication control unit 114 transmits the connection request and the user name of the user originating the connection to the table-top game devices 100 of the other room users, i.e., the destination of connection (hereinafter, referred to as "connection destination table-top game device 100" as necessary) via the cable communication unit 128.

The communication control unit 114 in the connection destination table-top game device 100 acquires the connection request and the user name of the user originating the connection via the cable communication unit 128. The communication unit 114 transmits the connection request to the portable game terminal 200 via the wireless communication unit 126. The series of steps described above are performed between a plurality of portable game terminals 200 so that a virtual ad-hoc network is formed between the portable game terminals 200. Subsequently, a plurality of users can play the online game in the same virtual space provided by the portable game terminals 200.

The communication control unit 114 in the connection source table-top game device 100 and the connection destination table-top game device 100 informs the room update processing unit 190 of the user name of the user originating the connection and the fact that the request for connection from the portable game terminal 200 is accepted. In this process, the room update processing unit 190 directs the room display control unit 188 to display a portable game terminal object 168, which indicates that preparation in the portable game terminal 200 of the user originating the connection is completed. The room display control unit 188 sets up screen data for the room 160 so that the portable game terminal object 168 is displayed in the neighborhood of the avatar 162 of the user originating the connection in the room 160. In this way, the display of the portable game terminal object 168 in the room 160 is synchronized so that the room users can know the timing to start the online game.

The communication control unit 114 in the connection source table-top game device 100 and the connection destination table-top game device 100 may also inform the lobby update processing unit 18 of the room name entered by the user originating the connection and the fact that the request for connection from the portable game terminal 200 is accepted. The lobby update processing unit 18 may set up a message for the room comment of the room thus communicated to indicate that preparation in the portable game terminal 200 is completed. In this way, the lobby user requesting immediate participation in the online game can view the room comment of the rooms created in the lobby 140 and select the room with the message as the room to enter.

Figure 13:
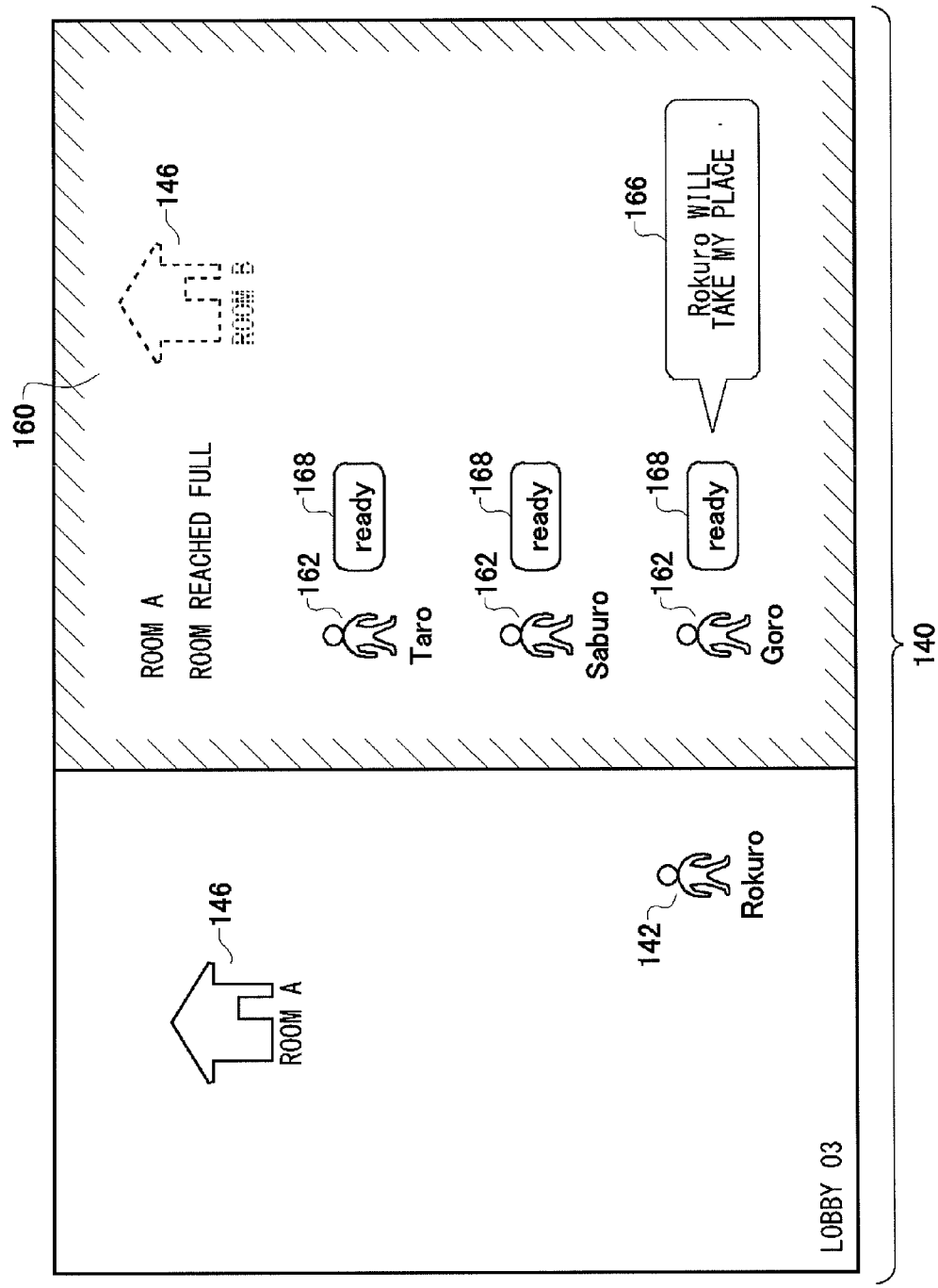
FIG. 13 shows a screen of a room displayed on the display of the user.

FIG. 13 shows a screen of the room 160 displayed on the display of the user. The figure shows a status occurring after the online game is started in the status of FIG. 12 by the room user in the room A.

When the online game is started, users participating in the game tend to care only about controlling the portable game terminal 200 and rarely are the status of the lobby 140 or the room 160 known by the user. However, users may want to give a message to another user during the game. In the example of FIG. 10, the user "Goro" gives notification that the user "Rokuro" will take over using the chat function. To let the other users know the message, the user "Goro" uses the game controller to cause his or her table-top game device 100 to output sound to call the attention of the users (hereinafter, also referred to "attention-calling sound").

Upon detecting that user operation to output attention-calling sound is performed via the input and output unit 124, the user operation determination unit 112 requests the sound output control unit 194 to output attention-calling sound (hereinafter, referred to as "sound output request"). The sound output control unit 194 causes the locally connected speaker to output attention-calling sound via the input and output unit 124. Along with this, the unit 194 transmits a sound output request to the other table-top game devices 100 via the communication control unit 114 and the cable communication unit 128.

Upon receiving the sound output request via the cable communication unit 128, the communication control unit 114 in the other table-top game devices 100 sends the request to the sound output control unit 194. The sound output control unit 194 causes the locally connected speaker to output attention-calling sound via the input and output unit 124. This causes attention-calling sound to be output from the speakers of the user "Taro" and the user "Saburo" in accordance with the user operation of the user "Goro". The "Taro" user and the "Saburo" user can know the status of the room 160 and know the message from "Goro".

Since attention-calling sound can be output from other devices by local user operation, the likelihood that a user fails to notice a message of another user in user-to-user communication is reduced. In other words, reliability of information transmission is improved. Separation of the screen of a community site from the game screen according to the embodiment is particularly suitable because user can focus attention on the game screen during the game.

The information exchange system 1000 of the embodiment aids communication between a plurality of users at dispersed locations by providing users with information exchange service in a community site. Users can know the status of the lobby 140 after entering a room or during the game and so can communicate with other users depending on the status of the lobby 140. For example, FIG. 13 shows that the user "Goro" knows that the user "Rokuro" enters the lobby 140 and gives out a message to the user "Taro" and the user "Saburo" to indicate "Rokuro" will take over.

Described above is an explanation based on an exemplary embodiment. The embodiment is intended to be illustrative only and it will be obvious to those skilled in the art that various modifications to constituting elements and processes could be developed and that such modifications are also within the scope of the present invention.

A description will be given of a first variation.

The portable game terminal 200 may further comprise an SSID setting unit for setting a service set ID (SSID) including a game ID uniquely defined for the game run in the terminal. The SSID identifies a group of terminals communicating with each other in a wireless network, i.e., a network identifier. The wireless communication unit 126 transmits and receives a data packet including the SSID set by the SSID setting unit to and from the portable game terminal 200. The storage unit 122 stores the game ID included in the SSID and the online game name, associating the ID and the name with each other. Upon detecting the SSID including the game ID in the data packet received by the wireless communication unit 126, the communication control 114 communicates the game ID to the lobby update processing unit 178. The lobby update processing unit 178 refers to the storage unit 122, acquires the online game name associated with the game ID, and sets up the acquired name as a room comment. In this way, a suitable room comment is automatically set even when user do not set up any room comments. In other words, the name of the online game about to be played by the room user is automatically set up as a room comment so that convenience of room users and lobby users is improved.

A description will be given of a second variation.

Referring to the first variation, upon detecting the SSID including the game ID in the packet received by the wireless communication unit 126, the communication control unit 114 may communicate the game ID to the other table-top game devices 100. Each of the communication control units 114 in the other table-top game devices 100 communicates the game ID to the wireless communication unit 126. Each of the wireless communication units 126 in the other table-top game devices 100 determines whether the game ID is included in the SSID of the data packet when the data packet is received from the portable game terminal 200. When it is determined that the game ID is included, the wireless communication unit 126 continues wireless communication with the portable game terminal 200. When it is determined that the game ID is not included, the wireless communication unit 126 terminates wireless communication with the portable game terminal 200. In this case, data packets from the portable game terminal 200 may be discarded. By performing a filtering process using a game ID, room users are prevented from starting to play different games. Also, the second variation avoids a trouble that could occur when the portable game terminal 200 receives game data that the terminal is not supposed to receive.

A description will be given of a third variation.

In this variation, as in the foregoing variations, the storage unit 122 stores the game ID that should be included in the SSID and the online game name, associating the ID and the name with each other. When creating the room object 146 in the lobby 140, the lobby user designates the name of the game that should be run by the room users of the room as in the case of a room comment. The user may select a specific game name from a pulldown menu in a wizard for creating a room object. The game name is stored in the management server 400 as a room attribute. When the user enters the room, the room entry processing unit 186 acquires the game name from the management server 400 and informs the communication control unit 114 of the name. The communication control unit 114 refers to the storage unit 122 to identify the game ID that should be included in the SSID and communicates the identified name to the wireless communication unit 126. As in the second variation, the wireless communication unit 126 performs a filtering process by determining whether the SSID of the data packet received from the portable game terminal 200 includes the game ID. According to the mode described above, the wireless communication unit 126 may be configured to filter users entering the room automatically, using the setting of the room object 146 done by the room user. In another variation, a game name may be defined for a lobby. In this case, the wireless communication unit 126 may be configured to filter users entering the lobby, using similar processes performed in the lobby entry processing unit 174 and the communication control unit 114.

A description will be given of a fourth variation.

The description of the embodiment gives a friend user as an example of friend attribute. It is assumed in the embodiment that a friend object 144 is set up for the avatar 142 of a friend user in the lobby 140. In one variation, other attributes may be defined as user attributes. Objects corresponding to those attributes may be associated with the avatar 142 in the lobby 140 or the avatar 162 in the room 160. Examples of attributes include sex, age, occupation, current state of mind, favorite game genre, favorite game title, etc.

A description will be given of a fifth variation.

According to the embodiment, the image of the room 160 is displayed in a semitransparent fashion and superimposed on the image of the lobby 140. In other words, the image of the room 160 and the image of the lobby 140 are superimposed on one another both temporarily and spatially. In one variation, the images may be superimposed only temporarily. For example, the image of the room 160 and the image of the lobby 140 may be displayed side by side without superimposing the images. Alternatively, the images may be superimposed only spatially. For example, the images may be switched in cycles such that the image of the room 160 is displayed for 10 seconds and then the image of the lobby 140 is displayed for several seconds. In any of the fashions described above, the room user can know the status of the lobby 140 so that convenience of the community site is improved.

A description will be given of a sixth embodiment. The embodiment described above assumes a single world including eight lobbies. However, there are no particular limits to the number of worlds or the number of lobbies. The numbers may be suitably determined depending on the expected number of lobby users, the number of housings or performance of the management server 400, the network bandwidth, etc. These constraints may define the upper limit of the number of users that can enter a lobby. For example, a single management server 400 may manage two worlds. Each world may include 64 lobbies, and the upper limit of 64 users may be allowed to enter each lobby.

A description will be given of a seventh embodiment. The embodiment described above assumes the table-top game device 100 as an example of a device for setting up screen data for the lobby 140 and the room 160. Devices for setting up the screen data may not be limited to game devices but may of course be ordinary PCs or other information processing devices.

Any combination of the embodiment and the variations may also be useful as an embodiment of the present invention. New embodiments produced by the combination will provide the advantages of the embodiment and the variations as combined.

It will be understood by those skilled in the art that the functions to be achieved by the constituting elements described in the claims are implemented by the constituting elements alone or in combination.

"Objects associated with a plurality of users" refer to objects displayed in the lobby 140. The objects include the avatar 142, the friend object 144, the room object 146, and the message object 156.

DESCRIPTION OF THE REFERENCE NUMERALS

100 table-top game device, 110 data processing unit, 112 user operation determination unit, 114 communication control unit, 116 world control unit, 118 lobby control unit, 120 room control unit, 122 storage unit, 124 input and output unit, 126 wireless communication unit, 128 cable communication unit, 130 world, 140 lobby, 160 room, 176 lobby display control unit, 188 room display control unit, 194 sound output control unit, 200 portable game terminal, 300 Internet, 400 management server, 1000 information exchange system

INDUSTRIAL APPLICABILITY

The present invention can be used in information processing devices for aiding communication between a plurality of users.

The invention claimed is:

1. An information processing device connected to a predetermined game execution terminal, comprising:
   a display control unit configured to display an image in which a plurality of users exchange information; and
   a communication control unit,
   wherein the predetermined game execution terminal is operable to initialize and execute a game by a user independently of the information processing device,
   wherein the predetermined game execution terminal is connected, via a communication path, during execution of the game to a second game execution terminal operable to concurrently execute the game,
   wherein the communication path from the predetermined game execution terminal includes communication through the information processing device and a second information processing device connected to the second game execution terminal,
   wherein the communication control unit receives, from the predetermined game execution terminal, a service set ID (SSID) for identifying a group of predetermined game execution terminals communicating with each other,
   wherein the communication control unit transmits to the second information processing device predetermined information mapped to the SSID as information related to a specified game of the predetermined game execution terminal, thereby allowing the second information processing device to display the predetermined information as the information related to the specified game of the predetermined game execution terminal,
   wherein, when the SSID is received from the predetermined game execution terminal, the display control unit displays the predetermined information mapped to the SSID,
   wherein the communication control unit receives information related to the specified game of the second game execution terminal transmitted from the second information processing device,
   wherein, when the information related to the specified game of the second game execution terminal is received, the display control unit causes the information to be displayed,
   wherein the communication control unit is operable to receive a request for connection to the predetermined game execution terminal issued by the second game execution terminal and transferred by the second information processing device, and is operable to transfer the request for connection to the predetermined game execution terminal, thereby connecting the predetermined game execution terminal to the second game execution terminal via the communication path, and
   wherein, when the communication control unit receives the request for connection from the second information processing device, the display control unit displays an image indicating that preparation of the specified game in the second game execution terminal is completed, thereby alerting the user of the predetermined game execution terminal to start the specified game in the predetermined game execution terminal.

2. The information processing device according to claim 1, wherein the SSID includes a game ID of the game executed in the predetermined game execution terminal,
   wherein the communication control unit is operable: to receive the SSID from the predetermined game execution terminal; and to transmit to the second information processing device a game name mapped to the game ID of the game included in the SSID as information related to the game of the predetermined game execution terminal, thereby allowing the display control unit of the information processing device and the second information processing device to display the game name mapped to the game ID, wherein the communication control unit is further operable to receive a game name transmitted from the second information processing device as information related to a game of the second game execution terminal, thereby allowing the display control unit of the information processing device to display the received game name.

3. The information processing device according to claim 1, wherein the display control unit comprises:

a lobby display control unit configured to display an image of a lobby as a virtual space where a plurality of users exchange information, and to display objects associated with the plurality of users at predetermined positions in the lobby; and a room display control unit configured to display an image of a room as a virtual space where at least one of the plurality of users is allowed to form a group and where the plurality of users can enter from the lobby, wherein the objects displayed by the lobby display control unit include avatars associated with the plurality of users, the avatars being displayed in a predetermined fashion determined by respective attributes of the plurality of users, and wherein the room display control unit displays the image of the room along with the image of the lobby where the avatars are displayed in the fashion determined by the respective attributes of the plurality of users so as to distinguish whether a user requesting to participate in the group is located in the lobby.

4. The information processing device according to claim 1, wherein the display control unit comprises:

a lobby display control unit configured to display an image of a lobby as a virtual space where a plurality of users exchange information, and to display objects associated with the plurality of users at predetermined positions in the lobby, wherein the lobby display control unit initially displays the objects associated with the plurality of users at positions that are determined locally in the information processing device without being bound by the display positions of the objects as determined in the second information processing device, and wherein the lobby display control unit acquires, when an object is moved in the second information processing device, data indicating the destination position of movement from the second information processing device and moves the object to the destination position of movement.

5. The information processing device according to claim 1, further comprising:

a sound output control unit configured to output, independently of a status of execution of the game in the predetermined game execution terminal, sound to call attention of the user in the information processing device when a predetermined user operation is performed in the second information processing device.

6. An information processing device connected to a predetermined game execution terminal, comprising:

a display control unit configured to display an image in which a plurality of users exchange information; and a communication control unit, wherein the predetermined game execution terminal is operable to initialize and execute a game by a user independently of the information processing device, wherein the predetermined game execution terminal is connected, via a communication path, during execution of the game to a second game execution terminal operable to concurrently execute the game, wherein the communication path from the predetermined game execution terminal includes communication through the information processing device and a second information processing device connected to the second game execution terminal, wherein the communication control unit receives, from the predetermined game execution terminal, a service set ID (SSID) for identifying a group of terminals communicating with each other, the SSID including game ID of the game executed in the predetermined game execution terminal, wherein, when the game ID of the game included in the SSID received from the predetermined game execution terminal does not match a game ID of a predefined game in the information processing device, the communication control unit limits subsequent communication with the predetermined game execution terminal, and wherein the communication control unit is operable to receive a request for connection to the predetermined game execution terminal issued by the second game execution terminal and transferred by the second information processing device and is operable to transfer the request for connection to the predetermined game execution terminal, thereby connecting the predetermined game execution terminal to the second game execution terminal via the communication path.

7. The information processing device according to claim 6, wherein the game ID of the predefined game in the information processing device is transmitted from the second information processing device receiving the SSID from the second game execution terminal, or defined by a user of the second game execution terminal in the second information processing device and transmitted from the second information processing device.

8. An information processing device comprising:

a display control unit configured to display an image of a virtual space in which a plurality of users exchange information; and a login processing unit configured to acquire information from an external device, the information indicating, for each of a plurality of virtual spaces that can be entered into by a user of the information processing device, whether an acquainted user invited by the user of the information processing device enters the virtual space, wherein the display control unit causes a selection screen to be displayed, the selection screen allowing the user of the information processing device to select a virtual space to enter among the plurality of virtual spaces, and causes the virtual space into which the acquainted user entered to be displayed in the selection screen, side by side and in a different mode from the remaining virtual spaces that the acquainted user did not enter.

9. The information processing device according to claim 8, wherein each of the plurality of virtual spaces is defined as a first virtual space, and a virtual space that allows at least some of the plurality of users entering a first virtual space to form a group and that can be created in the first virtual space by a user entering is defined as a second virtual space, wherein the login processing unit acquires from an external device information indicating, for each of the plurality of virtual spaces, whether a second virtual space is created within, and wherein the display control unit displays on the selection screen a first virtual space in which the second virtual space has been created, side by side with and in different modes from a first virtual space in which the second virtual space has not been created.

10. The information processing device according to claim 8, wherein the information processing device is connected to a predetermined game execution terminal, wherein the predetermined game execution terminal is operable to initialize and execute a game by a user independently of the information processing device, wherein the predetermined game execution terminal is connected, via a communication path, during execution of the game to a second game execution terminal operable to concurrently execute the game, wherein the communication path from the predetermined game execution terminal includes communication through the information processing device and a second information processing device connected to the second game execution terminal, and wherein the information processing device further comprises:

a communication control unit configured to receive a request for connection to the predetermined game execution terminal that has been issued by the second game execution terminal and transferred by the second information processing device, and configured to transfer to the predetermined game execution terminal the request for connection, thereby connecting the predetermined game execution terminal to the second game execution terminal via the communication path.

* * * * *

UNITED STATES PATENT AND TRADEMARK OFFICE
CERTIFICATE OF CORRECTION

PATENT NO. : 8,622,840 B2
APPLICATION NO. : 13/123011
DATED : January 7, 2014
INVENTOR(S) : Keiichiro Suzuki et al.

Page 1 of 1

It is certified that error appears in the above-identified patent and that said Letters Patent is hereby corrected as shown below:

On the Title Page:

Add

-- (30)   Foreign Application Priority Data

Oct 8, 2008  (JP)  ........................... 2008-262212 --

Signed and Sealed this
Thirteenth Day of January, 2015

Michelle K. Lee
*Deputy Director of the United States Patent and Trademark Office*